United States Patent
Nam et al.

(10) Patent No.: US 11,937,359 B2
(45) Date of Patent: Mar. 19, 2024

(54) WIRELESS INDUCTION HEATING COOKER AND WIRELESS INDUCTION HEATING SYSTEM INCLUDING SAME

(71) Applicant: LG Electronics Inc., Seoul (KR)

(72) Inventors: Hyeunsik Nam, Seoul (KR); Wan Soo Kim, Seoul (KR); Hyunwook Moon, Seoul (KR); Byungkyu Park, Seoul (KR); Yangkyeong Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 443 days.

(21) Appl. No.: 16/796,613

(22) Filed: Feb. 20, 2020

(65) Prior Publication Data

US 2020/0267806 A1    Aug. 20, 2020

(30) Foreign Application Priority Data

Feb. 20, 2019 (KR) .................. 10-2019-0020140
Nov. 14, 2019 (KR) .................. 10-2019-0145637

(51) Int. Cl.
*H05B 6/12* (2006.01)
*A47J 27/08* (2006.01)
*A47J 27/086* (2006.01)
*H02J 50/12* (2016.01)
(Continued)

(52) U.S. Cl.
CPC ........ *H05B 6/1209* (2013.01); *A47J 27/0802* (2013.01); *A47J 27/086* (2013.01); *H02J 50/12* (2016.02); *H02J 50/40* (2016.02); *H05B 6/062* (2013.01); *H05B 6/1236* (2013.01); *H05B 6/1245* (2013.01)

(58) Field of Classification Search
None
See application file for complete search history.

(56) References Cited

U.S. PATENT DOCUMENTS

2018/0192479 A1* 7/2018 Kwack et al. ........... H05B 6/06

FOREIGN PATENT DOCUMENTS

| CN | 106304451 A | * | 1/2017 | ........... H05B 6/1236 |
| CN | 107411547 | | 12/2017 | |
| CN | 108143256 A | * | 6/2018 | ............. A47J 36/38 |

(Continued)

OTHER PUBLICATIONS

Machine translation of JP 2001299570 A performed on Apr. 7, 2022, Urata et al. (Year: 2001).*
(Continued)

*Primary Examiner* — Dana Ross
*Assistant Examiner* — Kevin Guanhua Wen
(74) *Attorney, Agent, or Firm* — Fish & Richardson P.C.

(57) ABSTRACT

A wireless induction heating cooker includes a main body, a lid coupled to the main body, an internal pot stored in the main body, a first power receiving coil placed at a lower portion of an edge area of the internal pot, a lateral surface heating coil placed on an outer circumferential surface of the internal pot and connected with the first power receiving coil, a power transmitting coil provided on one lateral surface of an upper portion of the main body and supplied with electric currents induced to the first power receiving coil, and a second power receiving coil provided on one lateral surface of the lid and supplying electric currents induced by a magnetic field generated in the power transmitting coil to at least one of electronic devices.

16 Claims, 14 Drawing Sheets

(51) Int. Cl.
    *H02J 50/40*           (2016.01)
    *H05B 6/06*            (2006.01)

(56) References Cited

FOREIGN PATENT DOCUMENTS

| | | | | |
|---|---|---|---|---|
| DE | 112016006712 T5 | * | 12/2018 | ............ H02J 50/80 |
| EP | 3364717 A1 | * | 8/2018 | ............ H05B 6/06 |
| JP | H0584126 | | 4/1993 | |
| JP | 2001299570 | | 10/2001 | |
| JP | 2001299570 A | * | 10/2001 | ............ A47J 27/00 |
| JP | 2013137938 A | * | 7/2013 | ............ H05B 6/12 |
| JP | 2014033830 | | 2/2014 | |
| WO | WO2016042123 | | 3/2016 | |
| WO | WO 2018216298 A1 | * | 11/2018 | ............ A47J 27/00 |

OTHER PUBLICATIONS

Machine translation of CN 108143256 A performed on Apr. 7, 2022, Peng (Year: 2018).*
Machine translation of WO 2018216298 A1 performed on Apr. 7, 2022, Fujita et al. (Year: 2018).*
Machine translation of JP 2013137938 A performed on Apr. 8, 2022, Takahashi et al. (Year: 2013).*
Machine translation of DE 112016006712 T5 performed on Sep. 27, 2022, Yoshino et al. (Year: 2018).*
Machine translation of CN 106304451 A performed on May 11, 2023, Zhu et al. (Year: 2017).*
Extended European Search Report in European Appln. No. 20157652.7, dated Jul. 7, 2020, 8 pages.

* cited by examiner

PRIOR ART

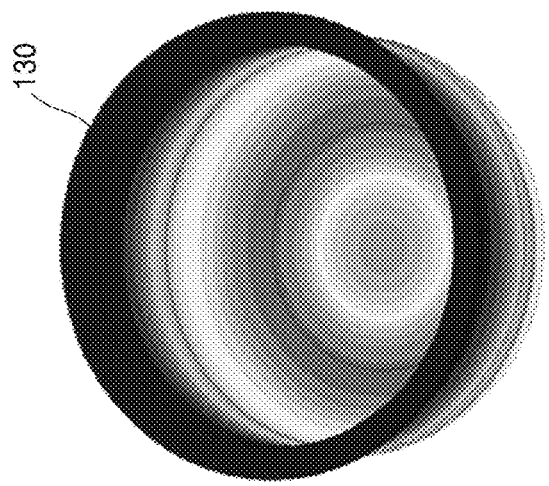
[Application of coil]
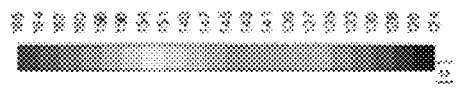
FIG. 6b
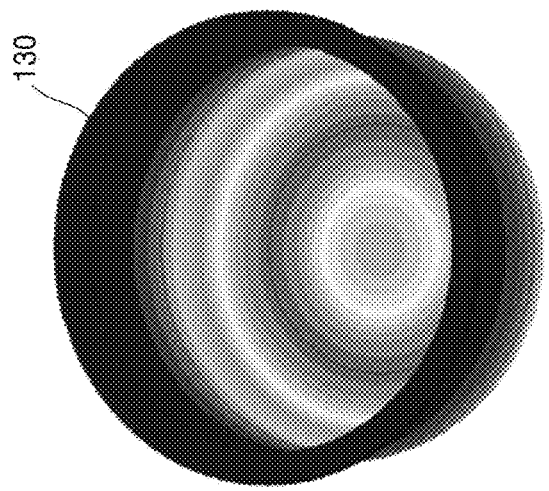
[Non-application of coil]
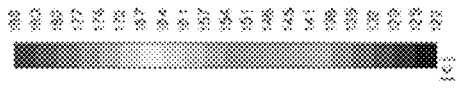

WIRELESS INDUCTION HEATING COOKER AND WIRELESS INDUCTION HEATING SYSTEM INCLUDING SAME

CROSS-REFERENCE TO RELATED APPLICATIONS

This application claims priority to and the benefit of Korean Patent Application No. 10-2019-0020140, filed on Feb. 20, 2019 and Korean Patent Application No. 10-2019-0145637, filed on Nov. 14, 2019, the disclosures of which are incorporated herein by reference in its entirety.

BACKGROUND

1. Technical Field

The present disclosure relates to a wireless induction heating cooker including an internal pot that is heated through induction heating and improves temperature uniformity, and a wireless induction heating system including an induction heating apparatus and a wireless induction heating cooker that performs cooking operations by wirelessly receiving power from the induction heating apparatus.

2. Background

Various types of cooking devices exist that use wireless induction heating. Research has been performed on various methods for heating a cooking item using a magnetic field generated in an induction heating apparatus.

Some electric rice cookers heat a cooking item through induction heating.

As shown in FIG. 1, an existing electric rice cooker 100' receives an internal pot 30' in an internal pot supporting part 14'. An induction heating coil 15' for heating the internal pot 30' is provided at a lower portion of the internal pot supporting part 14'. A heating power reception coil 16', which receives power from a power unit 20' and supply it to the induction heating coil 15', is provided on a bottom surface of a main body 12' of a rice cooking unit 10'.

In this configuration, a magnetic field generated in a heating power supply coil 23' provided at the power unit 20' induces a current in the heating power reception coil 16'. Additionally, a magnetic field generated in the heating power reception coil 16' induces a current in the induction heating coil 15', and the induced current generated in the induction heating coil 15' heats the internal pot 30'.

However, for heating the internal pot 30', this configuration requires a primary power delivery process between the heating power supply coil 23' and the heating power reception coil 16', and a secondary power delivery process between the heating power reception coil 16' and the induction heating coil 15'. During these power delivery processes, power (heat) loss may occur.

Although the induction heating coil 15' according to the prior art document is placed along a lower surface of the rounded internal pot, a portion of the induction heating coil 15' that is placed at an edge of the internal pot becomes far away from the heating power reception coil 16'. Accordingly, there is a big difference in temperatures between a lower surface of the internal pot 30' and a lateral surface of the internal pot 30'. Such lack of temperature uniformity throughout the internal pot may undermine cooking qualities.

In addition, various electronic devices may be built in an existing electric rice cooker 100'. However, the electric cooker 100' merely discloses a process of using a magnetic field generated in the heating power supply coil 23' to heat the internal pot 30', and does not consider powering various electronic devices built into the electric rice cooker 100'.

SUMMARY

The present disclosure relates to a wireless induction heating cooker that may improve temperature uniformity of an internal pot that is heated through induction heating.

The present disclosure relates to a wireless induction heating cooker that may heat a lateral surface of an internal pot as well as a bottom surface of the internal pot using a magnetic field generated in a heating coil.

The present disclosure relates to a wireless induction heating cooker that may heat a lateral surface of an internal pot using a magnetic field generated in an area having low efficiency in delivering heat to a bottom surface of the internal pot.

The present disclosure relates to a wireless induction heating system that may perform entire cooking operations by wirelessly receiving power from an induction heating apparatus.

Aspects and advantages of the present disclosure are not limited to those described herein. Other aspects and advantages that have not been explicitly mentioned may be clearly understood from the description herein.

Particular embodiments described herein include a wireless induction heating cooker. The wireless induction heating cooker may be configured to operate on an induction heating apparatus including a heating coil. The wireless induction heating cooker may include a main body, a lid, an internal pot, a first power receiving coil, a lateral surface heating coil, a power transmitting coil, and a second power receiving coil. The main body may have an upper surface defining an opening. The lid may be configured to be coupled to the upper surface of the main body. The internal pot may be received in the main body and configured to be heated using a first magnetic field generated in the heating coil of the induction heating apparatus. The first power receiving coil may be placed on an inner bottom surface of the main body. Electric currents may be induced by the first magnetic field generated in the heating coil. The lateral surface heating coil may be placed on an outer circumferential surface of the internal pot, and may be connected with the first power receiving coil and configured to heat the internal pot using the currents induced in the first power receiving coil. The power transmitting coil may be disposed on a lateral surface of the main body and configured to receive the electric currents induced to the first power receiving coil and generate a second magnetic field. The second power receiving coil may be disposed on a lateral surface of the lid and configured to supply electric currents to one or more electronic devices. The electric currents may be induced by the second magnetic field generated in the power transmitting coil.

In some implementations, the system can optionally include one or more of the following features. The lid may be hinged to the main body and configured to be selectively opened and closed, or is detachably attached to the main body. The first power receiving coil may be horizontally placed below an edge area of the internal pot. A bottom surface of the internal pot may include a flat plate area oriented in parallel with the heating coil. The edge area may connect the flat plate area to a lateral surface of the internal pot. The flat plate area may be disposed within a first area having a first reference radius with respect to a central perpendicular line of the internal pot. The edge area may be disposed within a second area between a circumference of the first area having the first reference radius and an outer diameter of the internal pot. A distance between the edge area and the heating coil may become greater in a direction from a center of the internal pot toward a circumferential portion of the internal pot. The edge area may be defined between an outer diameter of the internal pot and a second reference radius. The wireless induction heating cooker may include a resonance capacitor. One end of the first power receiving coil and one end of the lateral surface heating coil may be connected to each other. The other end of the first power receiving coil and the other end of the lateral surface heating coil may be connected to each other through the resonance capacitor. A number of turns of the lateral surface heating coil may be more than a number of turns of the first power receiving coil. A surface area of a bottom surface of the internal pot may be smaller than a surface area of the heating coil. An outer diameter of the first power receiving coil may be smaller than an outer diameter of the heating coil. The internal pot may include a metallic plate on an outer surface thereof. The metallic plate may be configured to be heated by a magnetic field generated in the heating coil. The one or more electronic devices may include at least one of a control module, a communication module, a display module, a steam discharge module, or a battery. The one or more electronic devices may be disposed in the lid. The wireless induction heating cooker may include a first power conversion circuit configured to deliver electric currents induced to the first power receiving coil to the power transmitting coil. The power transmitting coil may be disposed along an outer lateral surface of the main body. The second power receiving coil may be disposed along an outer lateral surface of the lid. The second power receiving coil may be disposed at a position corresponding to a position of the power transmitting coil. The second power receiving coil may be placed such that at least a portion of the second power receiving coil at least partially covers the power transmitting coil. The wireless induction heating cooker may include a second power conversion circuit configured to deliver the electric currents induced to the second power receiving coil to the one or more electronic devices.

Particular embodiments described herein include a wireless induction heating system including an induction heating apparatus and a wireless induction heating cooker. The induction heating apparatus may include a heating coil defining a heating area, and may be configured to generate a magnetic field through the heating coil. The wireless induction heating cooker may be configured to operate on the heating area of the induction heating apparatus. The wireless induction heating cooker may include a main body, an internal pot received in the main body, a lid configured to cover the main body, and a first power receiving coil placed on an inner bottom surface of the main body. Electric currents may be induced by a first magnetic field generated in the heating coil. The cooker may further include a lateral surface heating coil placed on an outer circumferential surface of the internal pot. The lateral surface heating coil may be connected with the first power receiving coil and configured to heat the internal pot using the currents induced in the first power receiving coil. The cooker may further include a power transmitting coil disposed on a lateral surface of the main body and configured to receive electric currents induced to the first power receiving coil and generate a second magnetic field. The cooker may further include a second power receiving coil disposed on a lateral surface of the lid and configured to supply electric currents to an electronic device. The electric currents may be induced by the second magnetic field generated in the power transmitting coil.

Some implementations of a wireless induction heating cooker may use a magnetic field generated in a heating coil to directly heat a bottom surface of an internal pot and may use induced currents generated by the magnetic field to heat a lateral surface of the internal pot, thereby improving temperature uniformity of the internal pot.

Some implementations of a wireless induction heating cooker may include an internal pot placed on a heating coil, and a coil placed perpendicularly on an outer circumferential surface of the internal pot and generating a magnetic field, such that a lateral surface of the internal pot as well as a bottom surface of the internal pot are heated.

Some implementations of a wireless induction heating cooker may supply electric currents, induced to a coil placed at a lower portion of an edge area of an internal pot, to a coil placed on a lateral surface of the internal pot. Thus, a magnetic field that is generated in an area with low efficiency in delivering heat to a bottom surface of the internal pot can be used to heat a lateral surface of the internal pot.

Some implementations of a wireless induction heating system may include an induction heating apparatus that generates a magnetic field through a heating coil, and a wireless induction heating cooker that operates using electric currents induced by the magnetic field generated in the heating coil, such that power is wirelessly received from the induction heating apparatus and used to perform entire cooking operations.

Some implementations of the present disclosure may improve temperature uniformity of an internal pot heated through induction heating, thereby improving cooking qualities.

Some implementations of the present disclosure may heat a lateral surface of the internal pot as well as a bottom surface of the internal pot using a magnetic field generated in a heating coil, thereby forming a plurality of paths for heat delivery with a single heat source and ensuring temperature uniformity of the internal pot.

Some implementations of the present disclosure may use a magnetic field generated in an area having low efficiency in delivery of heat to the bottom surface of the internal pot, in order to heat the lateral surface of the internal pot, thereby efficiently using power output by the heating coil for heating the internal pot.

Some implementations of the present disclosure may wirelessly receive power from an induction heating apparatus and may perform entire cooking operations, thereby carrying out all operations for user convenience as well as an operation of cooking a cooking item, without a connection to an external power source or without an internal battery.

BRIEF DESCRIPTION OF THE DRAWINGS

Embodiments are described in detail with reference to the following drawings, wherein:

FIGS. 6a and 6b illustrate results heat conduction performance of an internal pot on the basis of whether a coil is applied;

DETAILED DESCRIPTION

Figure 1:
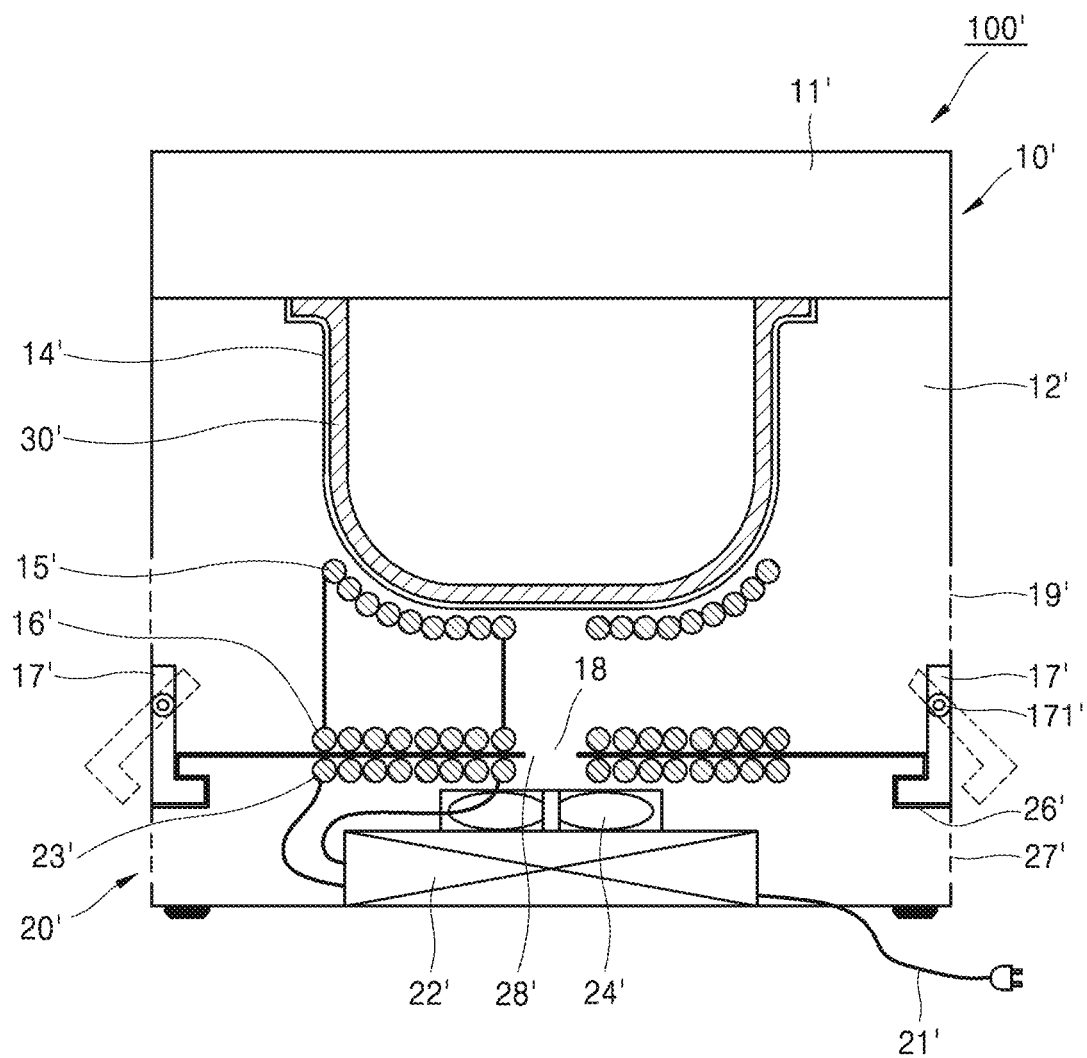
FIG. 1 is a side cross-sectional view of an electric rice cooker of the related art.

The present disclosure is specifically described with reference to the attached drawings such that one having ordinary skill in the art to which the present disclosure pertains may easily implement the technical spirit of the disclosure. A detailed description of known technologies relating to the present disclosure may be omitted if it is deemed to make the gist of the present disclosure unnecessarily vague. Some implementations of the present disclosure are specifically described with reference to the attached drawings. Throughout the drawings, identical reference numerals can be used to denote identical or similar components.

When a first component is described as being "at an upper portion" or "a lower portion" of a second component, the first component may be placed directly on the upper surface or the lower surface of the second component, or an additional component may be interposed between the first component and the second component. Similarly, where a first component is described as being "on" or "under" a second component, the first component may be placed directly on or under the second component, or an additional component may be interposed between the first component and the second component.

When a first component is described as being "connected" or "coupled" to a second component, the first component may be directly connected/coupled or able to be connected/coupled to the second component, or an additional component may be interposed between the first and second components, or the first and second components may be "connected" or "coupled" through an additional component.

The terms "A or B", "at least one of A or/and B", or "one or more of A or/and B" as used herein include all possible combinations of items enumerated with them. For example, "A or B", "at least one of A and B", or "at least one of A or B" means (1) including at least one A, (2) including at least one B, or (3) including both at least one A and at least one B.

In general, the present disclosure relates to a wireless induction heating cooker including an internal pot that is heated through induction heating and provides improved temperature uniformity. The present disclosure further relates to a wireless induction heating system including an induction heating apparatus and a wireless induction heating cooker that performs cooking operations by wirelessly receiving power from the induction heating apparatus.

Figure 2:
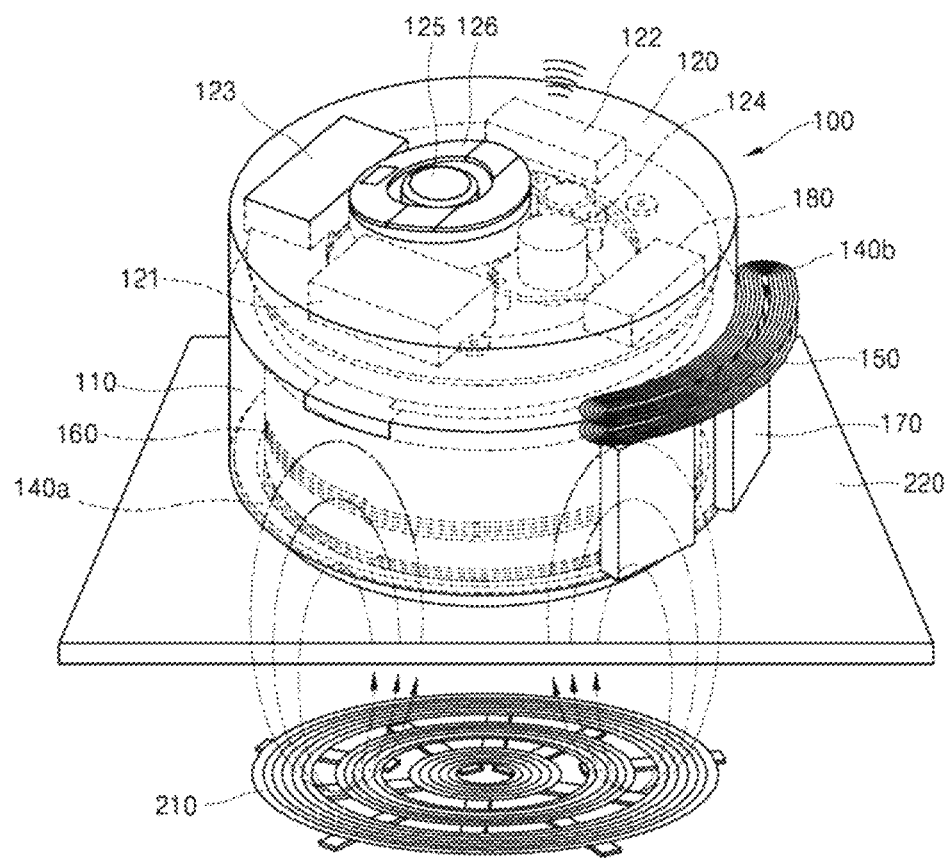
FIG. 2 illustrates an exemplary wireless induction heating cooker operating on an induction heating apparatus.
Figure 3:
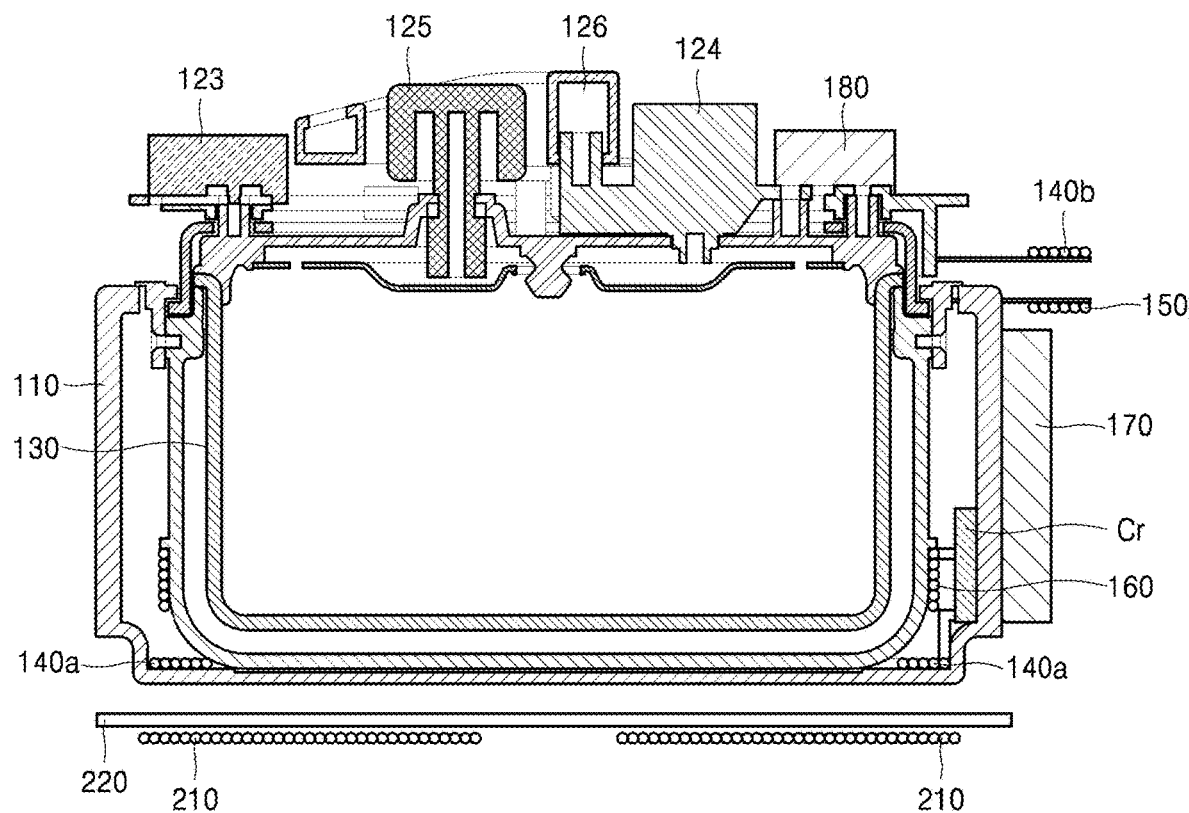
FIG. 3 is a side cross-sectional view of the wireless induction heating cooker and the induction heating apparatus in FIG. 2.
Figure 4:
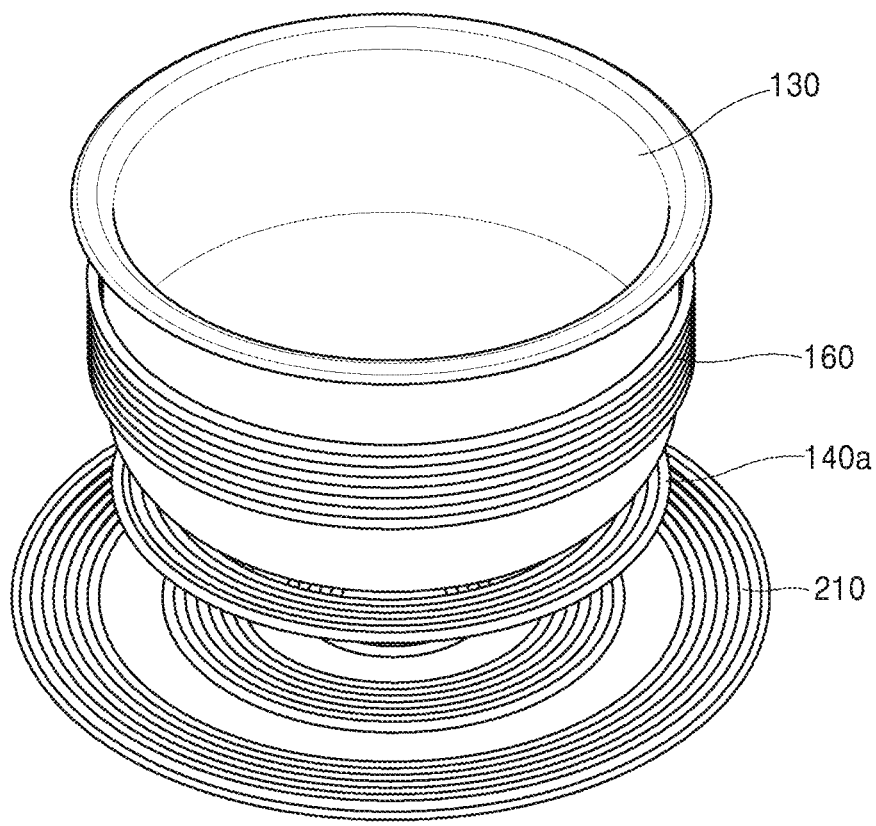
FIG. 4 illustrates an example intern pot heated on a heating coil and having example coils placed around the internal pot.
Figure 5A:
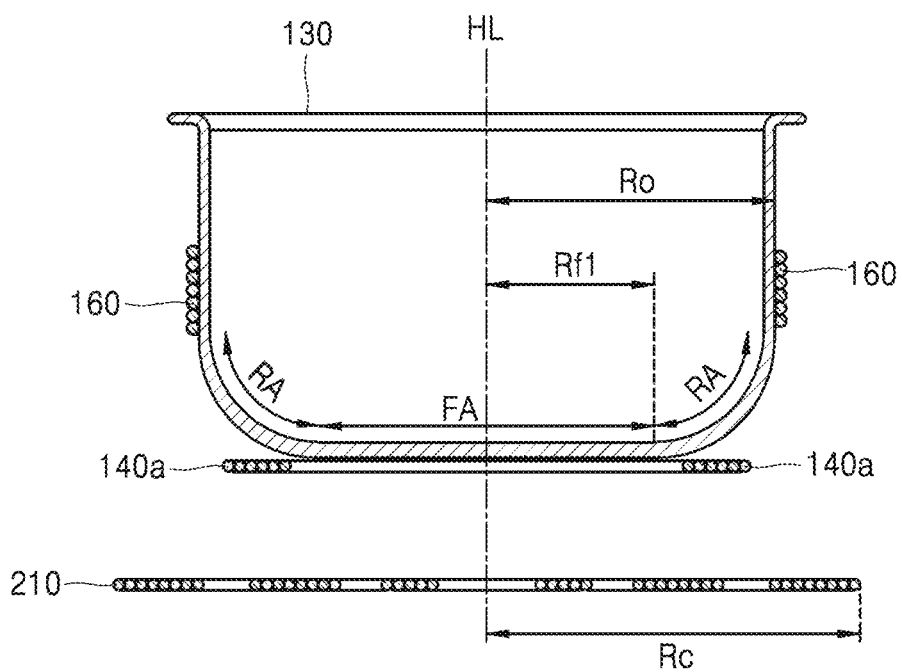
FIGS. 5a and 5b are side cross-sectional views of example arrangements of coils.
Figure 5B:
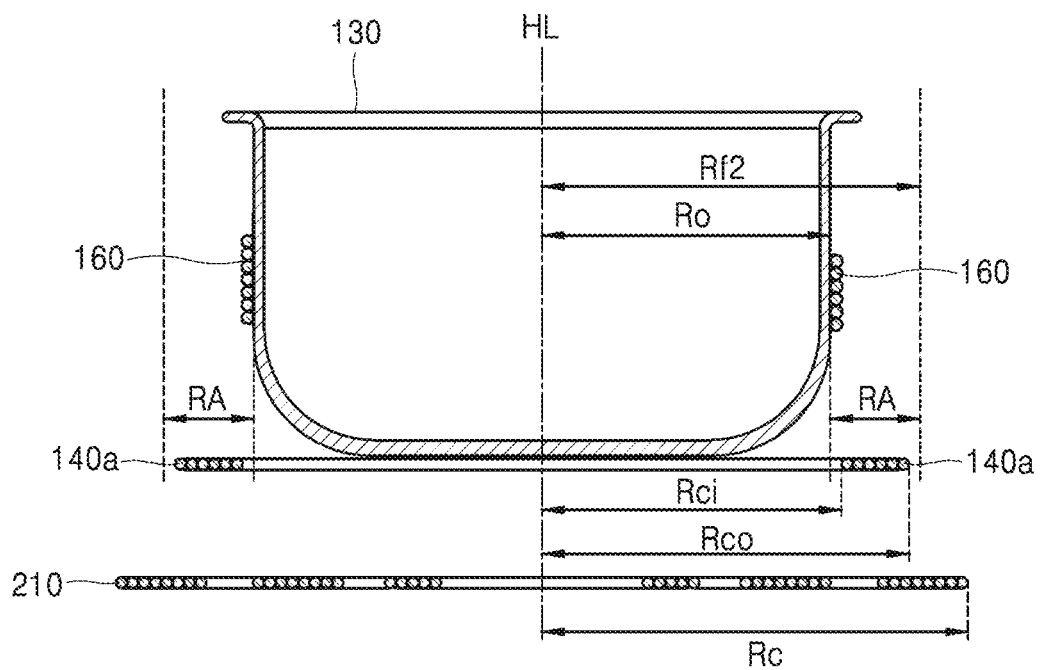
Figure 6A:
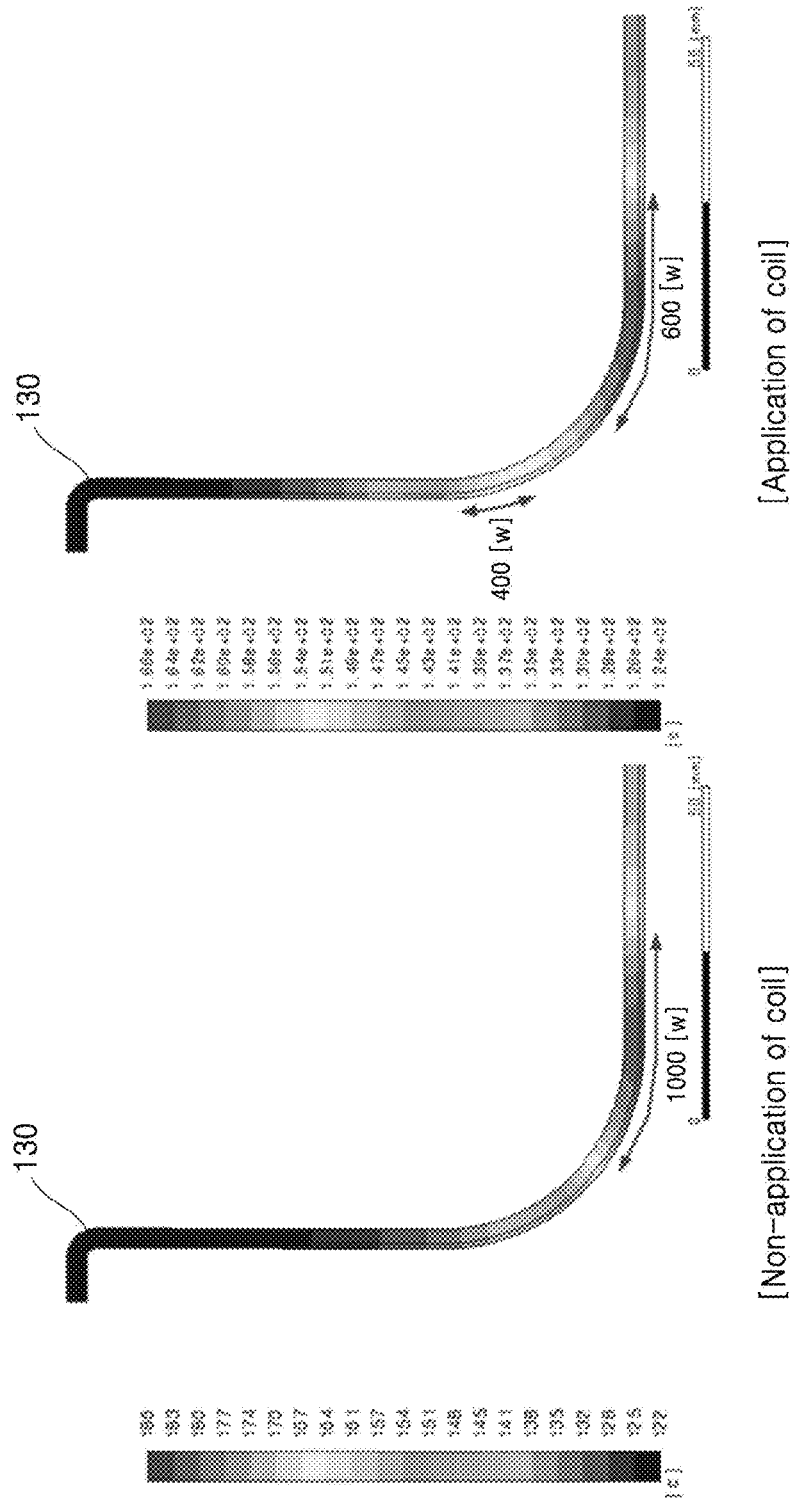
Figure 7:
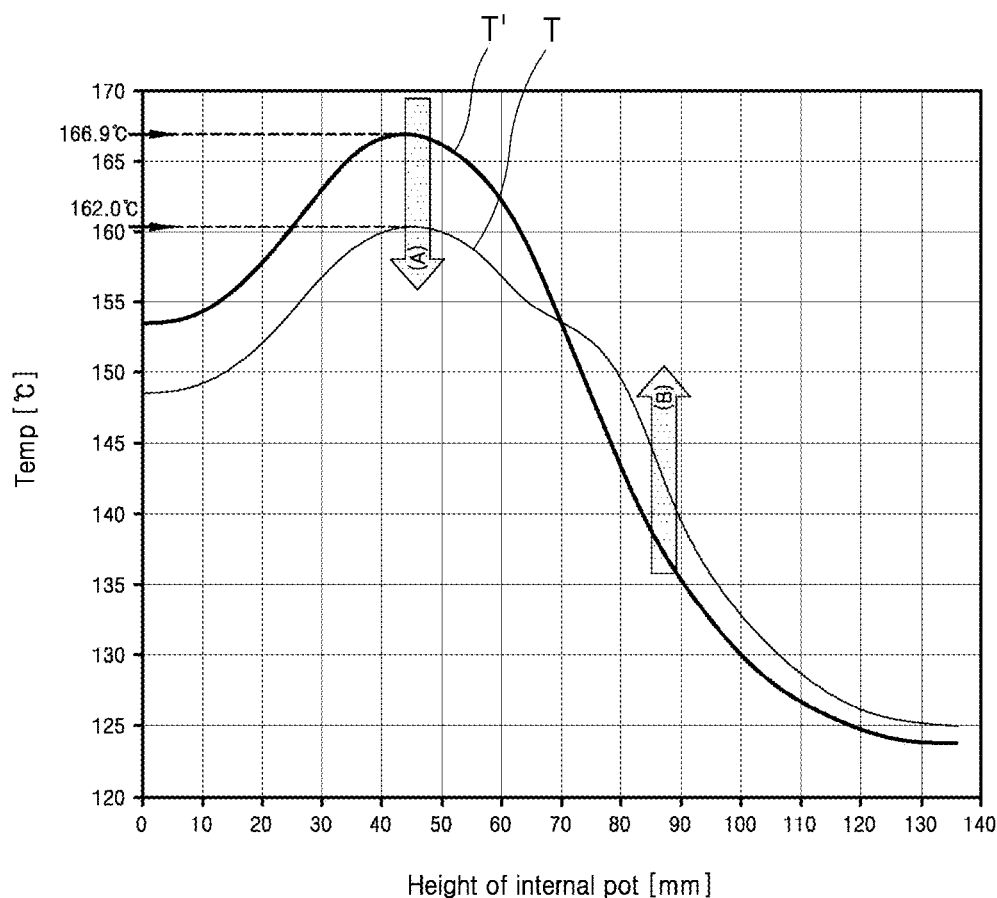
FIG. 7 is a graph illustrating changes in temperatures of an internal pot on the basis of whether a coil is applied.
Figure 8:
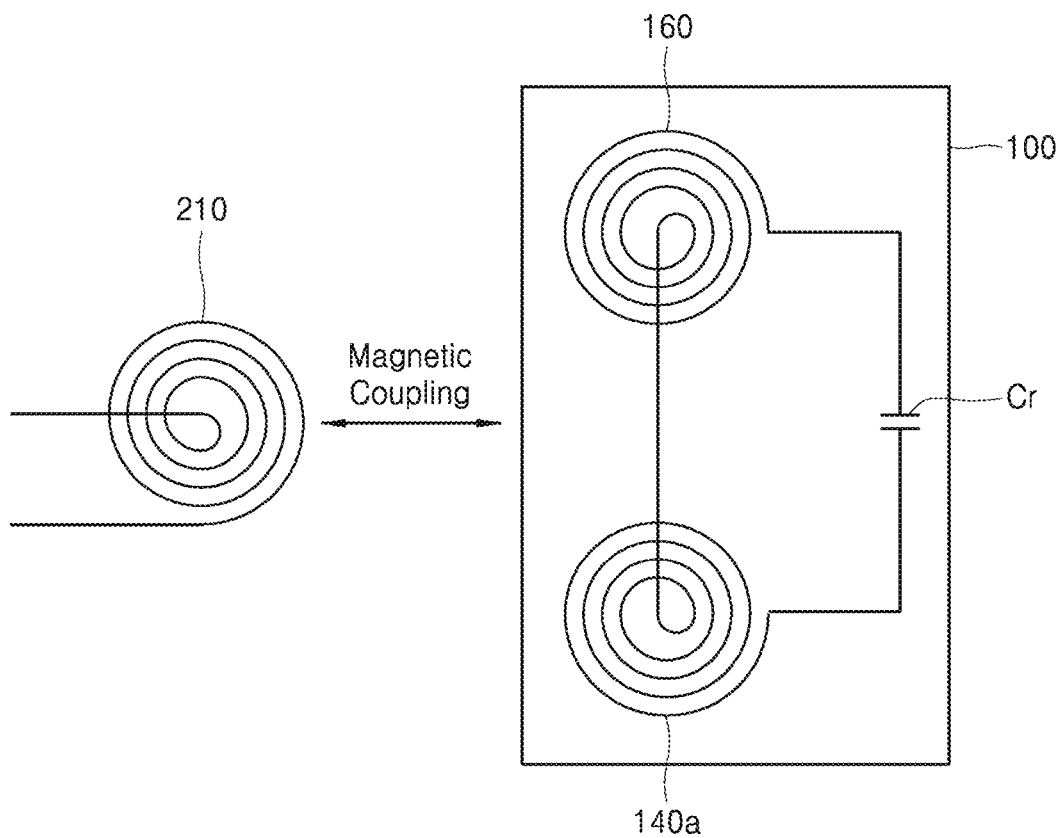
FIG. 8 illustrates that coils connected through a resonance capacitor is magnetically coupled to a heating coil.
Figure 9:
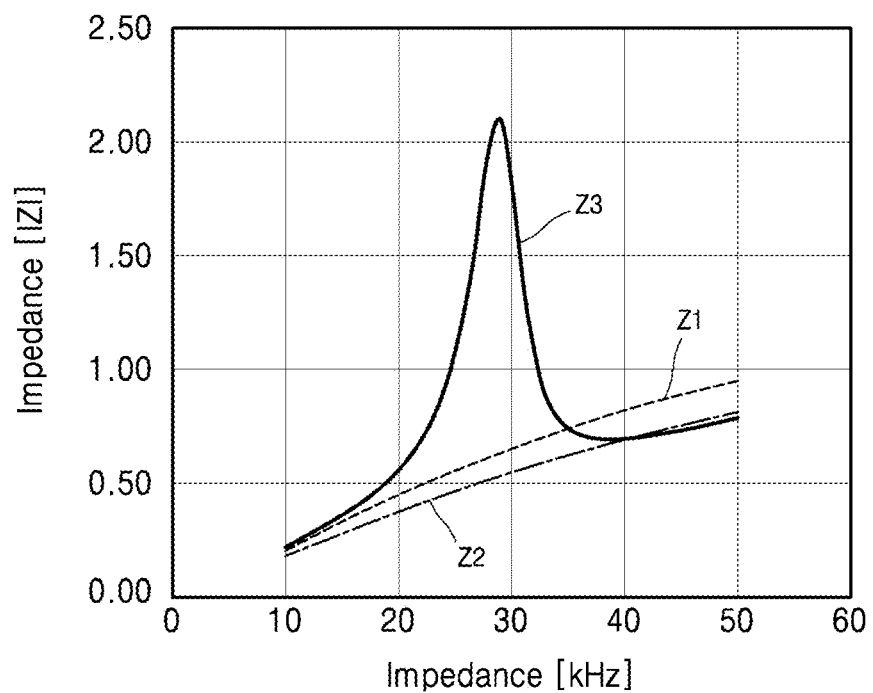
FIG. 9 is a graph illustrating impedance of an exemplary wireless induction heating cooker on the basis of whether a coil and a resonance capacitor are applied.
Figure 10:
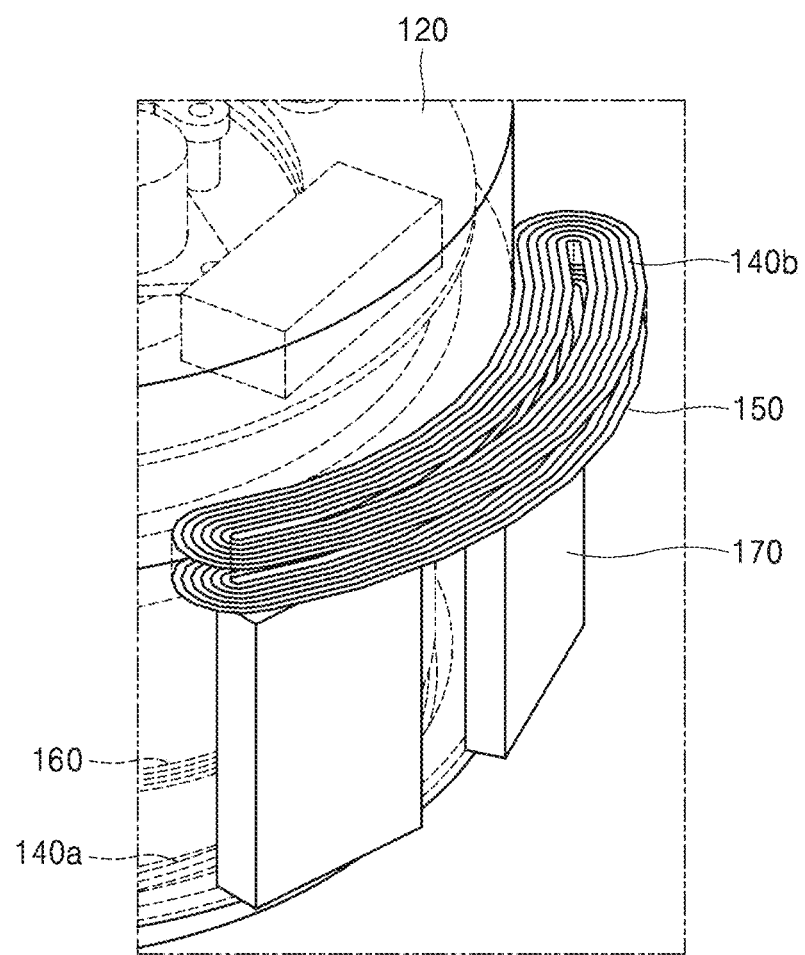
FIG. 10 is an enlarged view of a power transmitting coil and a second power receiving coil in FIG. 2.
Figure 11:
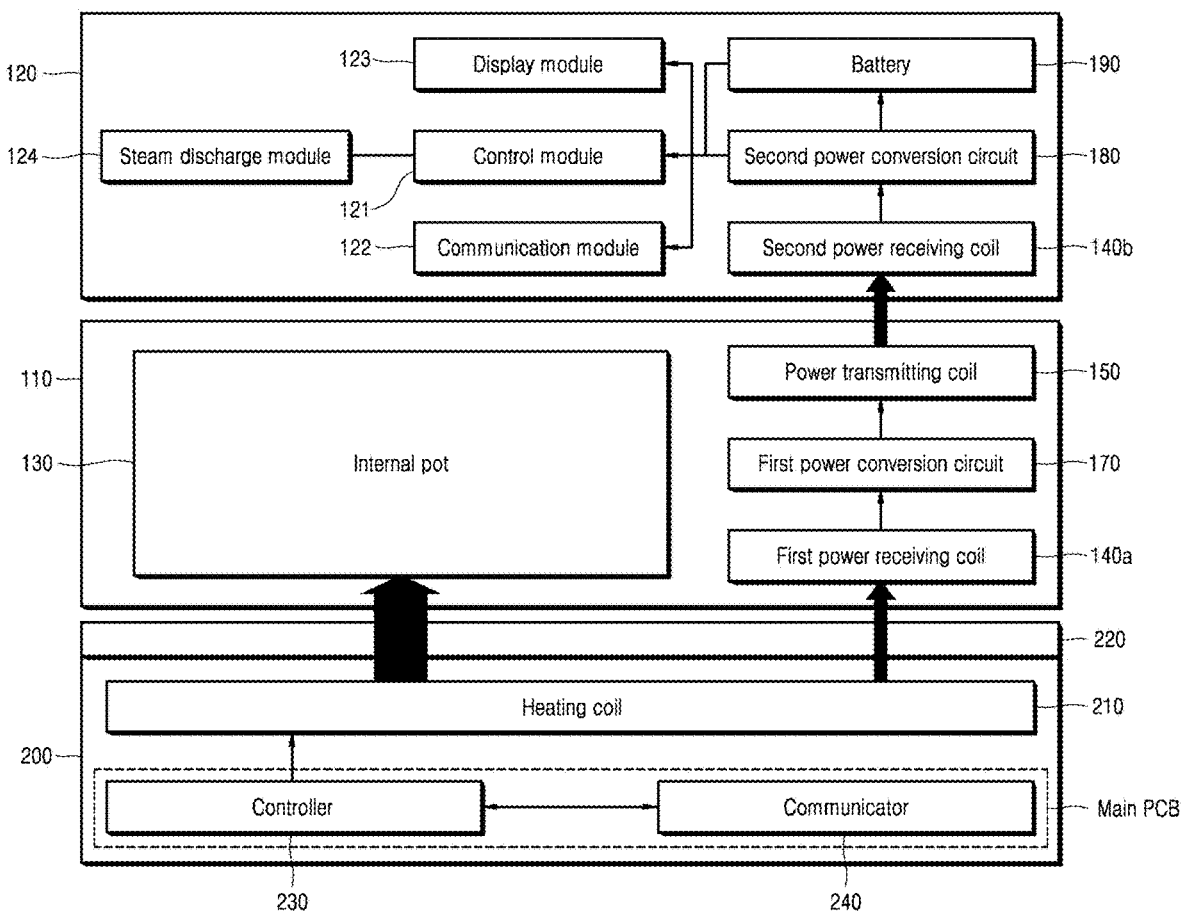
FIG. 11 is a flow chart of example control of a wireless induction heating cooker operating on an induction heating apparatus.

An exemplary wireless induction heating cooker is described with reference to FIGS. 2 to 11. FIG. 2 is a view of an exemplary wireless induction heating cooker operating on an induction heating apparatus, and FIG. 3 is a side cross-sectional view of the wireless induction heating cooker and the induction heating apparatus in FIG. 2. FIG. 4 illustrates an intern pot heated on a heating coil and each coil placed around the internal pot. Additionally, FIGS. 5a and 5b are views of an arrangement of a coil according to each example. FIGS. 6a and 6b illustrate results of comparison of heat conduction performance of an internal pot on the basis of whether a coil is applied, and FIG. 7 is a graph illustrating changes in temperatures of an internal pot on the basis of whether a coil is applied. FIG. 8 is a view illustrating coils connected through a resonance capacitor magnetically that are coupled to a heating coil, and FIG. 9 is a graph illustrating impedance of an exemplary wireless induction heating cooker on the basis of whether a coil and a resonance capacitor are applied. FIG. 10 is an enlarged view of the power transmitting coil and the second power receiving coil in FIG. 2. Additionally, FIG. 11 is a flow chart illustrating control of a wireless induction heating cooker operating on an induction heating apparatus.

Referring to FIGS. 2 and 3, an exemplary wireless induction heating cooker 100 may include a main body 110, a lid 120, an internal pot 130, a first power receiving coil 140a, a lateral surface heating coil 160, a power transmitting coil 150, and a second power receiving coil 140b. Additionally, the lid 120 may include a control module 121, a communication module 122, a display module 123, a steam discharge module 124, a pressure weight 125, and a noise reduction module 126.

In other implementations, the wireless induction heating cooker 100 may include other components in addition to those illustrated in FIGS. 2 and 3, or with one or more of those being modified or removed.

The wireless induction heating cooker 100 may operate on any suitable induction heating apparatus that heats an item through electromagnetic induction.

The wireless induction heating cooker 100, as illustrated in FIGS. 2 and 3, may operate in the state of being placed on an upper plate 220 of any suitable induction heating apparatus having a heating coil 210. Specifically, the wireless induction heating cooker 100 may operate in the state of being placed on the upper plate 220 on a perpendicular line of the heating coil 210.

Electric currents may flow through the heating coil 210 according to control by the induction heating apparatus. Accordingly, a magnetic field may be generated in the heating coil 210. As described below, the magnetic field generated in the heating coil 210 may induce electric currents to the internal pot 130 and the first power receiving coil 140a, and may heat a bottom surface and a lateral surface of the internal pot 130.

For example, the main body 110, which may be a case supporting a lower portion and a lateral portion of the wireless induction heating cooker 100, may have a cylinder shape with its upper portion being opened. In the main body 110, cooking may be performed. Specifically, the internal pot 130 is received in the main body 110, and various types of grain such as rice may be heated and cooked in the internal pot 130.

The lid 120, which may be a case for sealing an upper portion of the wireless induction heating cooker 100, may be coupled onto an upper surface of the main body 110. In this case, the lid 120 may be coupled onto the upper surface of the main body 110 such that the lid 120 is opened and closed with respect to the upper surface of the main body 110.

As an example, the lid 120 may be hinged to the main body 110 and may be selectively opened and closed. Specifically, the lid 120 is coupled to a hinge shaft provided at an edge of one surface of the upper portion of the main body 110 and is swiveled around the hinge shaft such that the lid 120 is selectively opened and closed with respect to the upper surface of the main body 110.

As another example, the lid 120 may be detachably attached to the main body 110. Specifically, the lid 120 may be coupled to the upper surface of the main body 110 by a plurality of coupling members provided at an edge of the upper portion of the main body 110. In this case, the lid 120 can be completely separated from the main body 110. The lid 120 may be easily cleaned when separated from the main body 110.

The lid 120, as illustrated in FIGS. 2 and 3, may include at least one electronic device. The lid 120, for example, may include a control module 121 that controls entire operations of the wireless induction heating cooker 100, a communication module 122 that performs data communication with the induction heating apparatus, a display module 123 that visually outputs state information of the wireless induction heating cooker 100, and other suitable electronic devices. Additionally, the lid 120 may include a battery for supplying power to the control module 121, the communication module 122, the display module 123, and other suitable electronic devices.

In some implementations, the control module 121, the communication module 122, and the display module 123 may be implemented as a printed circuit board (PCB) comprised of a plurality of integrated circuits (IC).

Further, the lid 120 can include a pressure weight 125 for maintaining internal pressures of the wireless induction heating cooker 100 at a constant level. In addition, the lid 120 can include a noise reduction module 126 that has a sound absorption member therein to reduce noise when steam is discharged. Furthermore, the lid 120 may be provided with a steam discharge module 124 (e.g., a solenoid valve) for discharging steam from the wireless induction heating cooker 100 according to a specific control signal.

The internal pot 130 may be received in the main body 110 and may be heated by a magnetic field generated in the heating coil 210 of the induction heating apparatus. The internal pot 130 may have a shape corresponding to a shape of a storage space provided in the main body 110. For example, when the main body 110 has a cylinder shape, the internal pot 130 may also have a cylinder shape with the upper surface being opened.

When the wireless induction heating cooker 100 is placed on an upper portion of the induction heating apparatus, the heating coil 210 and a lower surface of the internal pot 130 may be placed to face each other with a bottom surface of the main body 110 therebetween. When electric currents flow through the heating coil 210, a magnetic field generated in the heating coil 210 may induce electric currents to the internal pot 130, and Joule's heat may be generated in the internal pot 130 by the induced currents.

For generation of induced currents, the internal pot 130 may be made of a suitable material having magnetic properties. The internal pot 130, for example, may be made of one or more materials including cast iron including iron (Fe), or clad in which iron (Fe), aluminum (Al), stainless steel, and/or other suitable materials are welded.

The first power receiving coil 140a may be arranged horizontally and placed below an edge area (RA) of the internal pot 130. Electric currents may be induced to the first power receiving coil 140a by a magnetic field generated in the heating coil 210.

The edge area of the internal pot 130 can be an area defined in a radial direction and may be an area adjacent to a cylindrical surface of the internal pot 130. In other words, the edge area may be defined as an area adjacent to a circumference of the internal pot 130 when the internal pot 130 is seen from its top. The edge area is further described with reference to FIGS. 5a and 5b.

Referring to FIGS. 2 and 3, the first power receiving coil 140a may be placed on an inner bottom surface of the main body 110 at a lower portion of the edge area of the internal pot 130. The first power receiving coil 140a may be placed in contact with the inner bottom surface of the main body 110. Where an internal pot support member is provided on the inner bottom surface of the main body 110, the first power receiving coil 140a may be placed on the internal pot support member with or without contacting with the inner bottom surface of the main body 110.

The first power receiving coil 140a may have a ring shape with a predetermined inner diameter and a predetermined outer diameter, and a cross section of the first power receiving coil 140a may be placed at the lower portion of the edge area.

The first power receiving coil 140a may be placed horizontally. For example, the first power receiving coil 140a, which is a single-layered flat plate coil, may be placed horizontally in parallel with the heating coil 210. Accordingly, when electric currents flow through the heating coil 210, the electric currents may be induced to the first power receiving coil 140a by a magnetic field generated in the heating coil 210.

The lateral surface heating coil 160 may be placed on an outer circumferential surface of the internal pot 130 so as to be arranged vertically (e.g., perpendicularly to the first power receiving coil 140a). The later surface heating coil 160 may be connected to the first power receiving coil 140a, and may heat the internal pot 130 using electric currents induced to the first power receiving coil 140a.

Referring to FIGS. 2 and 3, the lateral surface heating coil 160 may be wound along the outer circumferential surface of the internal pot 130, and may be placed in contact with the outer circumferential surface of the internal pot 130. In implementations that the main body 110 includes an internal pot support member for supporting the internal pot 130 in the main body 110 such that the internal pot support member supports the outer circumferential surface of the internal pot 130 as well as the bottom surface of the internal pot 130, the lateral surface heating coil 160 may also be placed on the internal pot support member.

The lateral surface heating coil 160 may be perpendicularly placed relative to the first power receiving coil 140a. For example, the lateral surface heating coil 160 is a coil having a plurality of layers according to the number of its turns, and the layers may be arranged to be in parallel with the outer circumferential surface of the internal pot 130 (e.g., perpendicularly to the first power receiving coil 140a).

The lateral surface heating coil 160 may be electrically connected with the first power receiving coil 140a. In other words, one end of the lateral surface heating coil 160 may be connected with one end of the first power receiving coil 140a. Thus, the first power receiving coil 140a and the lateral surface heating coil 160 may be implemented as a single metallic wire, and, in this case, the first power receiving coil 140*a* and the lateral surface heating coil 160 may be distinguished by their positions and functions.

The lateral surface heating coil 160 may be electrically connected with the first power receiving coil 140*a*, and, accordingly, electric currents induced to the first power receiving coil 140*a* may flow through the lateral surface heating coil 160. When electric currents flow through the lateral surface heating coil 160, a magnetic field may be generated in the lateral surface heating coil 160, and the magnetic field generated in the lateral surface heating coil 160 may induce electric currents to the outer circumferential surface of the internal pot 130 and may heat the internal pot 130, such as the lateral surface of the internal pot 130.

FIG. 4 illustrates a heating coil 210, an internal pot 130, a first power receiving coil 140*a* placed at the edge area of the internal pot 130, and a lateral surface heating coil 160 placed on the outer circumferential surface of the internal pot 130. The other structure and arrangement of the internal pot 130, the first power receiving coil 140*a*, and the lateral surface heating coil 160 are described with reference to FIGS. 4, 5*a* and 5*b*.

In some implementations, a surface area of the bottom surface of the internal pot 130 may be smaller than a surface area of the heating coil 210. The area formed by the heating coil 210 may be configured as a minimum area that may include all parts of the heating coil 210.

For example, when the heating coil 210 is a planar circular coil, a surface area of the heating coil 210 may be a surface area of a circle having a coil radius that is a distance from a center of the heating coil 210 to an outer circumferential surface of the heating coil 210.

As illustrated in FIGS. 5*a* and 5*b*, a surface area of the bottom surface of the internal pot 130 may be a surface area of a circle having an outer diameter (Ro) of the internal pot 130, which is distance between a central perpendicular line (HL) of the internal pot 130 and the outer circumferential surface of the internal pot 130.

In this case, the surface area of the circle having the outer diameter (Ro) of the internal pot 130 may be smaller than the surface area of the circle having the coil radius (Rc). Accordingly, a magnetic field generated in the heating coil 210 may all be delivered to the bottom surface of the internal pot 130 without a leak in an area in which the internal pot 130 is placed.

As such, some implementations of the present disclosure provides a solution to receive a magnetic field generated in the heating coil 210 without a leak, thereby efficiently raising temperatures of the internal pot 130 with output from the induction heating apparatus.

Referring to FIG. 5*a*, in some implementations, the bottom surface of the internal pot 130 may include a flat plate area (FA) in parallel with the heating coil 210, and an edge area (RA) connecting the flat plate area (FA) and the lateral surface of the internal pot 130.

An edge portion (referred to as "rounded portion") of the bottom surface of the internal pot 130 may be rounded such that a cooking item is easily removed after cooking is completed. Accordingly, the bottom surface of the internal pot 130 may include a flat plate area (FA) that is a flat portion formed in parallel with the heating coil 210, and a rounded portion that is rounded to connect the bottom surface and the lateral surface of the internal pot 130.

As an example, the edge area (RA) of the internal pot 130, as illustrated in FIG. 5*a*, may be a rounded portion. In this case, the first power receiving coil 140*a* may be placed horizontally below the edge area (RA) of the internal pot 130, that is, below the rounded portion.

For example, the flat plate area (FA) of the bottom surface of the internal pot 130 may be formed within a first reference radius (Rf1) with respect to the central perpendicular line (HL) of the internal pot 130, and the edge area (RA) of the bottom surface of the internal pot 130 may be formed between the first reference radius (Rf1) and the outer diameter (Ro) of the internal pot 130. The first reference radius (Rf1) may be predetermined to meet design needs for a wireless induction heating cooker.

In this structure, the first power receiving coil 140*a* may be placed between the first reference radius (Rf1) and the outer diameter (Ro) of the internal pot 130. In other words, a range of horizontal arrangements of the first power receiving coil 140*a* may fall within a range between the first reference radius (Rf1) and the outer diameter (Ro) of the internal pot 130.

Referring to FIG. 5*a*, in some implementations, a distance between the edge area (RA) and the heating coil 210 may become greater toward a portion farther away from a center of the internal pot 130.

For example, a perpendicular distance (Rd') between the edge area (RA) and the heating coil 210 at a portion relatively far from the center of the internal pot 130 may be greater than a perpendicular distance (Rd) between the edge area (RA) and the heating coil 210 at a portion relatively close to the center of the internal pot 130.

Accordingly, an amount of heat generated by a magnetic field generated in the heating coil 210 may be smaller in the edge area (RA) than in the flat plate area (FA). Further, an amount of heat generated in a portion of the edge area (RA) that is farther from the center of the internal pot 130, may be smaller than an amount of heat generated in a portion of the edge area (RA) that is closer to the center of the internal pot 130.

The first power receiving coil 140*a* is placed below the edge area (RA), in which the smallest amount of heat is generated, thereby supplying electric currents induced by the heating coil 210 to the lateral surface heating coil 160 without causing a significant reduction in a total amount of heat generated in the internal pot 130.

As another example, the first power receiving coil 140*a*, as illustrated in FIG. 5*b*, may be vertically formed outside of the internal pot 130. For example, the edge area (RA) of the internal pot 130 may be formed between the outer diameter (Ro) of the internal pot 130 and the second reference radius (Rf2). The second reference radius (Rf2) may be predetermined for design needs of a wireless induction heating cooker.

The structure of the internal pot 130 in FIG. 5*b* may be the same as the structure of the internal pot 130 in FIG. 5*a*. The edge area (RA) may be formed in the internal pot 130 in FIG. 5*a*, while the edge area (RA) may be formed outside of the internal pot 130 in FIG. 5*b*.

In this case, the first power receiving coil 140*a* may be placed at the lower portion of the edge area (RA) of the internal pot 130.

For example, in FIG. 5*b*, the first power receiving coil 140*a* can have a cross section with a predetermined horizontal width and with a ring shape. The first power receiving coil 140*a* can have a structure with the inner diameter (Rci) of the first power receiving coil 140*a* being larger than the outer diameter (Ro) of the internal pot 130. The first power receiving coil 140*a* may be placed at the lower portion of the internal pot 130.

In some implementations, the outer diameter (Rco) of the first power receiving coil 140*a* may be smaller than the coil radius (Rc) of the heating coil 210 such that induced currents are efficiently generated in the first power receiving coil 140*a*.

For example, as illustrated in FIG. 5*b*, the inner diameter (Rci) of the first power receiving coil 140*a* may be designed to be larger than the outer diameter (Ro) of the internal pot 130, and the outer diameter (Rco) of the first power receiving coil 140*a* may be designed to be smaller than the coil radius (Rc) of the heating coil 210. Accordingly, an area formed by the first power receiving coil 140*a* may all be perpendicularly included in an area formed by the heating coil 210. Thus, a magnetic field generated in the heating coil 210 may all be delivered to the first power receiving coil 140*a* without a leak in the area in which the first power receiving coil 140*a* is placed.

The first power receiving coil 140*a*, as described above, is placed below the edge area (RA) in which perpendicular heat conduction to the internal pot 130 does not occur. Accordingly, the first power receiving coil 140*a* may supply electric currents induced by the heating coil 210 to the lateral surface heating coil 160 without reducing an amount of heat generated in the internal pot 130.

The lateral surface heating coil 160, as described above, may be supplied with electric currents induced to the first power receiving coil 140*a* and may generate a magnetic field. The magnetic field generated in the lateral surface heating coil 160 can heat at least a portion of the outer circumferential surface of the internal pot 130 in which the lateral surface heating coil 160 is placed.

As such, some implementations of the present disclosure, may efficiently use power output by the heading coil in heating the internal pot. In particular, the present disclosure may use a magnetic field generated in an area having low efficiency in delivering heat to the bottom surface of the internal pot so that the lateral surface of the internal pot is heated by the magnetic field.

In some implementations, to improve efficiency in heating operations, the number of turns of the lateral surface heating coil 160 may be more than the number of turns of the first power receiving coil 140*a*.

As described with reference to FIGS. 5*a* and 5*b*, the first power receiving coil 140*a* is configured to generate induced currents and supply the generated induced currents to the lateral surface heating coil 160 so that a reduction in an amount of heat generated in the internal pot 130 is minimized.

In some implementations, the lateral surface heating coil 160 can be configured to heat the outer circumferential surface of the internal pot 130 in a wide range. For example, the first power receiving coil 140*a* has a relatively narrow horizontal width to minimize a reduction in the amount of heat generated in the internal pot 130, and the lateral surface heating coil 160 has a relatively wide perpendicular width to encircle the outer circumferential surface of the internal pot 130 in a wide range.

When the thicknesses of metallic wires of the first power receiving coil 140*a* and the lateral surface heating coil 160 are the same, the horizontal width and perpendicular width of each coil 140*a*, 160 may be proportional to the number of turns of wires. Accordingly, the number of turns of the first power receiving coil 140*a* may be less than the number of turns of the lateral surface heating coil 160 so that the width of the first power receiving coil 140*a* is smaller than the width of the lateral surface heating coil 160.

FIGS. 6*a* and 6*b* respectively show temperatures of an internal pot 130 having no coil, and temperatures of an internal pot 130 having the first power receiving coil 140*a* and the lateral surface heating coil 160.

When the bottom surface of the internal pot 130 having no coil is heated by an output of 1000 [W], the bottom surface of the internal pot 130 is heated up to 186 [° C.] while the upper portion of the internal pot 130 is heated only up to 122 [° C.]. Accordingly, there is a big difference in the temperatures of the surface of the internal pot 130, which is a maximum of 64 [° C.].

When the bottom surface of the internal pot 130 having the coils is heated by an output of 600 [W], and the outer circumferential surface (the lateral surface) of the internal pot 130 is heated by an output of 400 [W], the bottom surface of the internal pot 130 is heated up to 166 [° C.] while the upper portion of the internal pot 130 is heated up to 124 [° C.]. Accordingly, there is a difference in the temperatures of the surface of the internal pot 130, which is a maximum of 42 [° C.]. The difference in the temperatures of the surface of the internal pot 130 having the coils is 22 [° C.] less than the difference in the temperatures of the surface of the internal pot 130 without coils.

In other words, the internal pot 130 with the coils has better uniformity of temperature distribution than the internal pot 130 without the coils.

FIG. 7 is a graph illustrating temperatures (T') of the internal pot 130 that has no coils, and temperatures (T) of the internal pot 130 that includes the first power receiving coil 140*a* and the lateral surface heating coil 160, along the heights of the internal pots 130.

Temperature of the internal pot 130 with the coils may be lower than temperature of the internal pot 130 without the coils at a relatively low height portion (A), and temperature of the internal pot 130 with the coils may be higher than temperature of the internal pot 130 without the coils at a relatively high height portion (B). By doing so, when the first power receiving coil 140*a* and the lateral surface heating coil 160 are applied to the internal pot 130, the entire uniformity of temperature distribution of the internal pot 130 may be ensured.

As such, some implementations of the present disclosure may heat the lateral surface of the internal pot as well as the bottom surface of the internal pot using a magnetic field generated in the heating coil, thereby forming a plurality of paths for heat delivery with a single heat source and ensuring uniformity of temperature of the internal pot.

When the internal pot 130 does not include the first power receiving coil 140*a* and the lateral surface heating coil 160, the total impedance (|Z|) of the wireless induction heating cooker 100 may be the same as the impedance of the internal pot 130. However, when the first power receiving coil 140*a* and the lateral surface heating coil 160 are included in the internal pot 130, the total impedance (|Z|) of the wireless induction heating cooker 100 may be the same as a parallel synthesis of an impedance of the internal pot 130 and an impedance of the first power receiving coil 140*a* and the lateral surface heating coil 160. Accordingly, when the first power receiving coil 140*a* and the lateral surface heating coil 160 are included in the internal pot 130, the total impedance (|Z|) of the wireless induction heating cooker 100 may be reduced. Because of a reduction in the total impedance (|Z|), an output delivered from the heating coil 210 to the internal pot 130 may also be reduced. To prevent such a reduction in the output, the other end of the first power receiving coil 140*a* and the other end of the lateral surface heating coil 160 may be connected to each other through a resonance capacitor (Cr).

Referring to FIG. 8, one end of the first power receiving coil 140a, as described above, may be connected to one end of the lateral surface heating coil 160. Additionally, the other end of the first power receiving coil 140a and the other end of the lateral surface heating coil 160 may be respectively connected to ends of the resonance capacitor (Cr), respectively. Accordingly, the first power receiving coil 140a, the lateral surface heating coil 160, and the resonance capacitor (Cr) may form an LC resonance circuit.

The LC resonance circuit, formed as described above, may be magnetically coupled to the heating coil 210 at a resonance frequency, and, in this case, the total impedance (14) of the wireless induction heating cooker 100 may be maximized.

FIG. 9 respectively shows the total impedance (Z1, Z2, and Z3) of the wireless induction heating cooker 100 when it does not include coils, when it includes the first power receiving coil 140a and the lateral surface heating coil 160, and when it includes the coils 140a, 160 and the resonance capacitor (Cr).

The total impedance (Z2) of the wireless induction heating cooker 100 that includes the first power receiving coil 140a and the lateral surface heating coil 160 may be lower than the total impedance (Z1) of the wireless induction heating cooker 100 that does not include the coils 140a, 160. At the resonance frequency (e.g., 28 kH), the total impedance (Z3) of the wireless induction heating cooker 100 that includes the coils 140a, 160 and the resonance capacitor (Cr) may be much higher than the total impedance (Z1) of the wireless induction heating cooker 100 that does not include the coils and the total impedance (Z2) of the wireless induction heating cooker 100 that includes the first power receiving coil 140a and the lateral surface heating coil 160.

When the first power receiving coil 140a and the lateral surface heating coil 160, and the resonance capacitor (Cr) form the LC resonance circuit, and the wireless induction heating cooker 100 operates at the resonance frequency, an output delivered from the heating coil 210 to the internal pot 130 may be controlled at a maximum level.

When the output from the heating coil 210 is controlled at a maximum level, an amount of heat generated in the internal pot 130 may also be maximized so that the internal pot 130 can be heated rapidly.

In some implementations, to enhance the efficiency in power delivery and heat conduction of the internal pot 130, the internal pot 130 can include its outer surface including a metallic plate that is heated by a magnetic field generated in the heating coil 210.

In some implementations, to enhance the efficiency of heat conduction, the internal pot 130 may include a material (e.g., aluminum (Al), copper (Cu), and other suitable materials) that has high thermal conductivity while having almost no magnetic properties or no magnetic properties. In this case, almost no or no induced currents are generated by a magnetic field on the bottom surface of the internal pot 130. In this configuration, although the internal pot 130 has high thermal conductivity, heat is not generated on the bottom surface of the internal pot 130. To generate heat at the internal pot 130, a metallic plate may be formed on the bottom surface of the internal pot 130.

In some implementations, the metallic plate may include a material having magnetic properties, and may be attached onto the bottom surface of the internal pot 130 or may be coated on the bottom surface of the internal pot 130 through metal spraying.

Accordingly, when a magnetic field is generated in the heating coil 210, heat may be generated by induced currents at the metallic plate, and the heat generated at the metallic plate may be delivered to the internal pot 130.

As such, some implementations of the present disclosure may improve uniformity of temperatures of the internal pot that is heated through induction heating. As a result, the cooker may have improved cooking qualities.

In some implementations, The power transmitting coil 150 may be positioned on one lateral surface of the upper portion of the main body 110, and may receive the electric currents induced to the first power receiving coil 140a and generate a magnetic field.

Referring to FIG. 3, the power transmitting coil 150 may be supported by any suitable support member and may be fixed on one lateral surface of the upper portion of the main body 110. The power transmitting coil 150 may be placed in contact with the lateral surface of the main body 110 such that the size of the wireless induction heating cooker 100 is minimized.

For example, the power transmitting coil 150 may have a flat plate shape and may be placed horizontally and extend from the lateral surface of the main body 110 to face the second power receiving coil 140b as described below. For example, the power transmitting coil 150 may be placed to protrude perpendicularly on the lateral surface of the main body 110.

As an example, the power transmitting coil 150 may be formed on one lateral surface of the upper portion of the main body 110 along an outer surface of the main body 110.

Referring to FIG. 10, when the main body 110 has a cylinder shape, the power transmitting coil 150 may be formed along an outer circumferential surface of the main body 110 on one lateral surface of the upper portion of the main body 110. For example, the power transmitting coil 150 may be placed in contact with the outer circumferential surface of the main body 110 within a preset circular arc length. Accordingly, the power transmitting coil 150 may have a deformed oval shape in which a length of a major axis adjacent to the main body 110 is within the preset circular arc length.

When the main body 110 has a rectangle pillar shape, the power transmitting coil 150 may be formed along the outer surface of the main body 110 on one lateral surface of the upper portion of the main body 110. For example, the power transmitting coil 150 may have a rectangle shape in which a horizontal length adjacent to the main body 110 is within a preset length, or may have an oval shape in which a length of the major axis adjacent to the main body 110 is within the preset circular arc length.

The power transmitting coil 150 may be electrically connected with the first power receiving coil 140a, and, accordingly, electric currents induced to the first power receiving coil 140a may flow through the power transmitting coil 150. When electric currents flow through the power transmitting coil 150, a magnetic field may be generated in the power transmitting coil 150.

The wireless induction heating cooker 100 may further include a first power conversion circuit 170 that delivers electric currents induced to the first power receiving coil 140a to the power transmitting coil 150.

Referring to FIGS. 2, 3 and 10, the first power conversion circuit 170 may be disposed on one lateral surface of the main body 110 in the form of a packaged integrated circuit. For example, the first power conversion circuit 170 may be fixedly mounted on one lateral surface of the main body 110 at a lower portion of the power transmitting coil 150.

Referring to FIG. 11, an input terminal of the first power conversion circuit 170 may be connected to the first power receiving coil 140*a*, and an output terminal of the first power conversion circuit 170 may be connected to the power transmitting coil 150. Accordingly, the first power conversion circuit 170 may convert the electric currents induced to the first power receiving coil 140*a* into stable alternating currents and may supply the same to the power transmitting coil 150.

An amount of electric currents induced to the first power receiving coil 140*a* may vary depending on an output from the heating coil 210 and/or load of the internal pot 130 (moisture included in an item subject to cooking, an amount of an item subject to cooking, and the like). Additionally, an amount of electric currents induced to the first power receiving coil 140*a* may also vary depending on a relative position of the heating coil 210 and the wireless induction heating cooker 100 (e.g., a degree of positional matching between the heating coil 210 and the wireless induction heating cooker 100).

The first power conversion circuit 170 may store the electric currents induced to the first power receiving coil 140*a* as a predetermined voltage to minimize changes in the amount of the electric currents, and may convert the stored voltage into stable alternating currents and supply the stable alternating currents to the power transmitting coil 150.

Specifically, as an example, the first power conversion circuit 170 may include a low-pass filter (LPF), a converter and an inverter. The first power conversion circuit 170 may remove high harmonics of electric currents induced to the first power receiving coil 140*a* using the low-pass filter. The first power conversion circuit 170 may convert the electric currents that has passed through the low-pass filter into a DC voltage using the converter. The first power conversion circuit 170 may convert the DC voltage converted by the converter into stable alternating currents and may supply the stable alternating currents to the power transmitting coil 150, using the inverter. Thus, the power transmitting coil 150 may receive predetermined-frequency alternating currents and may generate a magnetic field.

The second power receiving coil 140*b* may be disposed on one lateral surface of the lid 120 and may supply electric currents induced by a magnetic field generated in the power transmitting coil 150 to at least one of electronic devices included in the lid 120.

Referring to FIG. 3, the second power receiving coil 140*b* may be supported by any suitable support member and may be fixed on one lateral surface of the lid 120. The second power receiving coil 140*b* may be placed in contact with the lateral surface of the lid 120 such that the size of the wireless induction heating cooker 100 is minimized.

For example, similarly to the power transmitting coil 150, the second power receiving coil 140*b* may have a flat plate shape and may be placed horizontally and extends from the lateral surface of the lid 120 to face the power transmitting coil 150. For example, the second power receiving coil 140*b* may be placed to protrude perpendicularly on the lateral surface of the lid 120.

As an example, the second power receiving coil 140*b* may be disposed on one lateral surface of the lid 120 along an outer surface of the lid 120.

Referring to FIG. 10, when the lid 120 has a cylinder shape, the second power receiving coil 140*b* may be formed along an outer circumferential surface of the lid 120 on one lateral surface of the lid 120. For example, the second power receiving coil 140*b* may be placed in contact with the outer circumferential surface of the lid 120 within a preset circular arc length. Accordingly, the second power receiving coil 140*b* may have a deformed oval shape in which a length of a major axis adjacent to the lid 120 is within the preset circular arc length.

When the lid 120 has a rectangle pillar shape, the second power receiving coil 140*b* may be formed along the outer surface of the lid 120 on one lateral surface of the lid 120. For example, the second power receiving coil 140*b* may have a rectangle shape in which a horizontal length adjacent to the lid 120 is within a preset length, or may have an oval shape in which a length of the major axis adjacent to the lid 120 is within the preset circular arc length.

The second power receiving coil 140*b* may be disposed on one lateral surface of the lid 120 at a position corresponding to the position of the power transmitting coil 150.

Induced currents may be generated in the second power receiving coil 140*b* by a magnetic field generated in the power transmitting coil 150. To maximize an amount of electric currents generated in the second power receiving coil 140*b*, the second power receiving coil 140*b* may be placed at a position corresponding to the position of the power transmitting coil 150. For example, the second power receiving coil 140*b* may be placed to face the power transmitting coil 150 at a position at which the second power receiving coil 140*b* is magnetically coupled to the power transmitting coil 150 with a maximum coupling factor.

As an example, the second power receiving coil 140*b* may be placed to perpendicularly overlap with the power transmitting coil 150.

For example, the second power receiving coil 140*b* may partially or completely cover the power transmitting coil 150. In other words, when the wireless induction heating cooker 100 is seen from its top, all or part of the second power receiving coil 140*b* may be included in an area formed by the power transmitting coil 150. However, in order for the second power receiving coil 140*b* and the power transmitting coil 150 are magnetically coupled with a maximum coupling factor, the second power receiving coil 140*b* can be entirely included in the area formed by the power transmitting coil 150.

Referring to FIG. 10, the second power receiving coil 140*b* and the power transmitting coil 150 may have the same size and shape. In this case, the second power receiving coil 140*b* may be perpendicularly overlapped with the power transmitting coil 150 completely. In other words, the second power receiving coil 140*b* and the power transmitting coil 150 of the same size and shape may be disposed in the lid 120 and the main body 110, respectively, so as to be spaced a predetermined perpendicular distance apart at the same horizontal position.

In some implementations, the second power receiving coil 140*b* may have a surface area smaller than that of the power transmitting coil 150. In this case, the second power receiving coil 140*b* may be completely included in the surface area formed by the power transmitting coil 150 perpendicularly. For example, as illustrated in FIG. 10, when the second power receiving coil 140*b* and the power transmitting coil 150 have a deformed oval shape in which centers of circular arcs constituting the major axes of the second power receiving coil 140*b* and the power transmitting coil 150 are the same, a length of the major axis of the second power receiving coil 140*b* may be shorter than a length of the major axis of the power transmitting coil 150.

With these configurations described above, a maximum amount of electric currents may be induced to the second power receiving coil 140*b*, and the second power receiving coil 140*b* may supply the induced currents to an electronic device in the lid 120.

Referring to FIG. 11, the second power receiving coil 140*b* may be electrically connected to a plurality of electronic devices in the lid 120. Accordingly, the plurality of electronic devices may be supplied with induced currents generated in the second power receiving coil 140*b* as a power source.

The plurality of electronic devices may operate using the power source supplied by the second power receiving coil 140*b*. For example, the control module 121 may control entire operations (e.g., a discharge and a cutoff of steam of the steam discharge module 124) of the wireless induction heating cooker 100 using the power source supplied by the second power receiving coil 140*b*. The communication module 122 may perform data communication with a communicator 240 of the induction heating apparatus using the power source supplied by the second power receiving coil 140*b*. Additionally, the display module 123 may visually output state information of the wireless induction heating cooker 100 using the power source supplied by the second power receiving coil 140*b*.

The wireless induction heating cooker 100, as illustrated in FIG. 11, may further include a second power conversion circuit 180 that delivers electric currents, induced to the second power receiving coil 140*b*, to an electronic device in the lid 120.

Referring to FIGS. 2 and 3, the second power conversion circuit 180 may be provided in the lid 120 in the form of a packaged integrated circuit. Referring to FIG. 11, an input terminal of the second power conversion circuit 180 may be connected to the second power receiving coil 140*b*, and an output terminal of the second power conversion circuit 180 may be connected to each of the electronic devices in the lid 120. Accordingly, the second power conversion circuit 180 may convert electric currents induced to the second power receiving coil 140*b* into a stable DC voltage and may supply the stable DC voltage to each electronic device in the lid 120.

For example, alternating currents may be induced to the second power receiving coil 140*b*, and each electronic device may be supplied with a predetermined-magnitude DC voltage as a power source to perform operations, according to its specification.

The second power conversion circuit 180 may store the electric currents induced to the second power receiving coil 140*b* as a DC voltage, may increase or decrease the stored DC voltage to generate a predetermined-magnitude DC voltage adequate for specifications of each electronic device, and may output the generated DC voltage to each electronic device.

As an example, the second power conversion circuit 180 may include a converter (e.g., a buck converter, a boost converter, a buck-boost converter, or other suitable converters), and a regulator. The second power conversion circuit 180 may convert alternating currents induced to the second power receiving coil 140*b* into a DC voltage using the converter. In this case, a voltage induced to the second power receiving coil 140*b* may be increased or decreased according to properties of the converter and may be converted into a DC voltage. The second power conversion circuit 180 may convert magnitude of the DC voltage converted by the converter into a predetermined-magnitude voltage adequate for specifications of each electronic device, and may output the converted predetermined-magnitude voltage to each electronic device, using the regulator.

Accordingly, each electronic device in the lid (e.g., the control module 121, communication module 122, and display module 123) may operate using a DC voltage adequate for its specifications.

As such, some implementations of the wireless induction heating cooker may perform entire cooking operations by wirelessly receiving power from the induction heating apparatus, thereby heating a cooking item and carrying out all the operations for user convenience, without a connection to an external power source or without an internal battery.

Referring to FIG. 11, the wireless induction heating cooker 100 may further include a battery 190 that stores the electric currents induced to the second power receiving coil 140*b*.

The battery 190 may be provided in the lid 120 and may store the electric currents induced to the second power receiving coil 140*b* as reserved power. The second power conversion circuit 180 may control magnitude of the electric currents induced to the second power receiving coil 140*b* to charge the battery 190.

The battery 190 may be connected to each of the electronic devices in the lid 120 and each connected electronic device may receive a power source from the battery 190 for operation. For example, when the electronic devices operates by using the DC voltage output from the second power conversion circuit 180 and the second power conversion circuit 180 no longer outputs DC voltages, the electronic devices may operate by receiving DC voltages from the battery 190.

Figure 12:
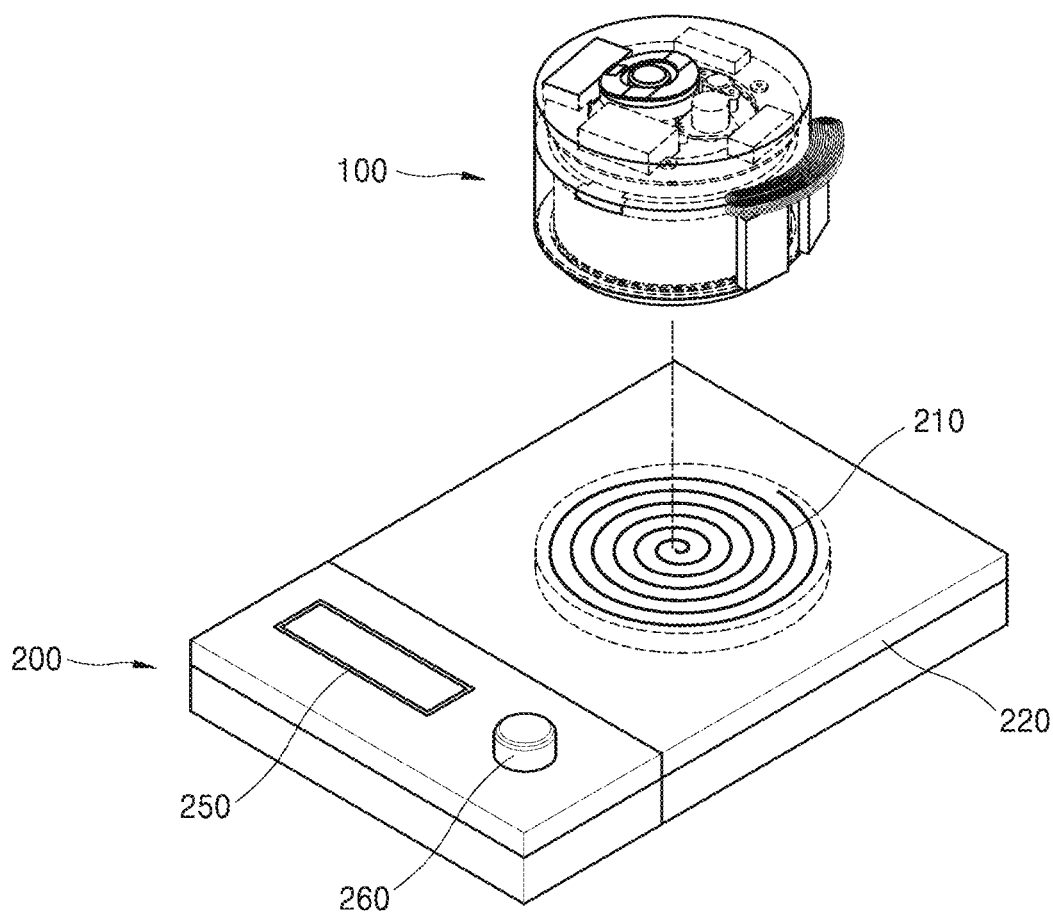
FIG. 12 illustrates an exemplary wireless induction heating system.

Referring to FIGS. 11-12, an exemplary wireless induction heating system is described.

FIG. 12 illustrates an exemplary wireless induction heating system. Referring to FIG. 12, the wireless induction heating system 1 may include an induction heating apparatus 200, and a wireless induction heating cooker 100 that operates on the induction heating apparatus 200. The induction heating apparatus 200 and the wireless induction heating cooker 100 in the wireless induction heating system 1 may be configured identically or similarly to the induction heating apparatus and the wireless induction heating cooker described with reference to FIGS. 2 to 10. Described below are primarily differences from those described in FIGS. 2-10.

The induction heating apparatus 200 may generate a magnetic field through the heating coil 210, and the wireless induction heating cooker 100 may operate on an area formed by the heating coil 210.

The area formed by the heating coil 210 may be a minimum area that may include all parts of the heating coil 210. For example, when the heating coil 210 is a planar circular coil, a surface area formed by the heating coil 210 may be a surface area of a circle having a coil radius that is a distance from a center of the heating coil 210 to an outer circumferential surface of the heating coil 210.

Referring to FIGS. 11 and 12, the induction heating apparatus 200 may include a heating coil 210, a controller 230, a communicator 240, a display 250 and a knob switch 260. In other implementations, the induction heating apparatus 200 can include other components in addition to those illustrated in FIGS. 11 and 12, or with one or more of those being modified or removed.

The controller 230 may control the heating coil 210 and the display 250. For example, the controller 230 may control output from the heating coil 210 and may control the display 250 such that the display 250 outputs state information of the induction heating apparatus 200.

The knob switch 260 may be arranged on an upper surface of the induction heating apparatus 200, and may supply a signal according to degrees of rotation of the knob switch to the controller 230. The controller 230 may determine output of the heating coil 210 according to the signal supplied by the knob switch 260. In other words, the output from the heating coil 210 may be controlled according to a degree to which the knob switch 260 rotates.

The wireless induction heating cooker 100 may be placed in the area formed by the heating coil 210 for operation. For example, an area formed by the bottom surface of the wireless induction heating cooker 100 may be positioned in the area formed by the heating coil 210.

The wireless induction heating cooker 100 may perform cooking operations using a magnetic field generated in the heating coil 210. The cooking operations may include entire operations of the control module 121, the communication module 122 and the display module 123 as well as an operation of cooking a cooking item by heating the internal pot.

The induction heating apparatus 200 and the wireless induction heating cooker 100 may share state information by performing mutual data communication. The induction heating apparatus 200 may control output of the heating coil 210 on the basis of state information of the wireless induction heating cooker, and the wireless induction heating cooker 100 may control an internal electronic device on the basis of state information of the induction heating apparatus 200.

The present disclosure described above may be replaced, modified and changed in various different forms by one having ordinary skill in the art to which the present disclosure pertains without departing from the technical spirit of the disclosure. Thus, the disclosure is not limited to the above-described embodiments and the accompanying drawings.

What is claimed is:

1. A wireless induction heating cooker, wherein the wireless induction heating cooker is configured to operate on an induction heating apparatus including a heating coil, the wireless induction heating cooker comprising:
    a main body having an upper surface defining an opening;
    a lid configured to be coupled to the upper surface of the main body;
    an internal pot received in the main body and configured to be heated using a first magnetic field generated in the heating coil of the induction heating apparatus;
    a first power receiving coil placed on an inner bottom surface of the main body, wherein electric currents are induced by the first magnetic field generated in the heating coil;
    a lateral surface heating coil placed on an outer circumferential surface of the internal pot and, the lateral surface heating coil being connected with the first power receiving coil and configured to heat the internal pot using the electric currents provided by the first power receiving coil;
    a power transmitting coil disposed on a lateral surface of the main body and configured to receive the electric currents induced to the first power receiving coil and generate a second magnetic field; and
    a second power receiving coil disposed on a lateral surface of the lid and that configured to supply electric currents to one or more electronic devices, the electric currents being induced by the second magnetic field generated in the power transmitting coil,
    wherein a first end of the first power receiving coil and a first end of the lateral surface heating coil are directly connected to each other, and a second end of the first power receiving coil and a second end of the lateral surface heating coil are connected to a resonance capacitor,
    wherein the first power receiving coil is horizontally placed below an edge area of the internal pot, and
    wherein the edge area is defined between an outer diameter of the internal pot and a second reference radius that is larger than the outer diameter of the internal pot.

2. The wireless induction heating cooker of claim 1, wherein the lid is hinged to the main body and configured to be selectively opened and closed, or is detachably attached to the main body.

3. The wireless induction heating cooker of claim 1, wherein a number of turns of the lateral surface heating coil is more than a number of turns of the first power receiving coil.

4. The wireless induction heating cooker of claim 1, wherein a surface area of a bottom surface of the internal pot is smaller than a surface area of the heating coil.

5. The wireless induction heating cooker of claim 1, wherein an outer diameter of the first power receiving coil is smaller than an outer diameter of the heating coil.

6. The wireless induction heating cooker of claim 1, wherein the internal pot includes a metallic plate on an outer surface thereof, the metallic plate configured to be heated by a magnetic field generated in the heating coil.

7. The wireless induction heating cooker of claim 1, wherein the one or more electronic devices include at least one of a control module, a communication module, a display module, a steam discharge module, or a battery.

8. The wireless induction heating cooker of claim 1, wherein the one or more electronic devices are disposed in the lid.

9. The wireless induction heating cooker of claim 1, further comprising:
    a first power conversion circuit configured to deliver electric currents induced to the first power receiving coil to the power transmitting coil.

10. The wireless induction heating cooker of claim 1, wherein the power transmitting coil is disposed along an outer lateral surface of the main body, and
    wherein the second power receiving coil is disposed along an outer lateral surface of the lid.

11. The wireless induction heating cooker of claim 1, wherein the second power receiving coil is disposed at a position corresponding to a position of the power transmitting coil.

12. The wireless induction heating cooker of claim 1, wherein the second power receiving coil is placed such that at least a portion of the second power receiving coil at least partially covers the power transmitting coil.

13. The wireless induction heating cooker of claim 1, further comprising:
    a second power conversion circuit configured to deliver the electric currents induced to the second power receiving coil to the one or more electronic devices.

14. A wireless induction heating system, comprising:
    an induction heating apparatus including a heating coil defining a heating area, and configured to generate a magnetic field through the heating coil; and
    a wireless induction heating cooker configured to operate on the heating area of the induction heating apparatus, the wireless induction heating cooker comprising:
        a main body,
        an internal pot received in the main body,
        a lid configured to cover the main body, a first power receiving coil placed on an inner bottom surface of the main body, wherein electric currents are induced by a first magnetic field generated in the heating coil, a lateral surface heating coil placed on an outer circumferential surface of the internal pot, the lateral surface heating coil being connected with the first power receiving coil and configured to heat the internal pot using the electric currents provided by the first power receiving coil, a power transmitting coil disposed on a lateral surface of the main body and configured to receive electric currents induced to the first power receiving coil and generate a second magnetic field, and a second power receiving coil disposed on a lateral surface of the lid and configured to supply electric currents to an electronic device, the electric currents being induced by the second magnetic field generated in the power transmitting coil, wherein a first end of the first power receiving coil and a first end of the lateral surface heating coil are directly connected to each other, and a second end of the first power receiving coil and a second end of the lateral surface heating coil are connected to a resonance capacitor, wherein the first power receiving coil is horizontally placed below an edge area of the internal pot, and wherein the edge area is defined between an outer diameter of the internal pot and a second reference radius that is larger than the outer diameter of the internal pot.

15. The wireless induction heating cooker of claim 1, wherein an inner diameter of the first power receiving coil is larger than the outer diameter of the internal pot.

16. The wireless induction heating cooker of claim 1, wherein an outer diameter of the first power receiving coil is smaller than a coil radius of the heating coil.

\* \* \* \* \*